United States Patent
Gibson et al.

(10) Patent No.: US 8,645,107 B2
(45) Date of Patent: Feb. 4, 2014

(54) AUTOMATIC COMPONENT INSERTION AND CONSTRAINT BASED ON PREVIOUS-USE DATA

(75) Inventors: Mark G. Gibson, Arlington, MA (US); Hailong Li, Acton, MA (US)

(73) Assignee: Dassault Systemes SolidWorks Corporation, Waltham, MA (US)

(*) Notice: Subject to any disclaimer, the term of this patent is extended or adjusted under 35 U.S.C. 154(b) by 237 days.

(21) Appl. No.: 13/242,792

(22) Filed: Sep. 23, 2011

(65) Prior Publication Data

US 2013/0080121 A1    Mar. 28, 2013

(51) Int. Cl.
*G06F 17/50* (2006.01)

(52) U.S. Cl.
CPC ..................... *G06F 17/50* (2013.01)
USPC .................... 703/1; 700/97; 700/98; 345/419

(58) Field of Classification Search
USPC .................... 703/1; 700/97–98; 345/419–420
See application file for complete search history.

(56) References Cited

U.S. PATENT DOCUMENTS

| 6,219,049 B1 | 4/2001 | Zuffante et al. |
| 7,079,990 B2 | 7/2006 | Haller et al. |
| 7,492,364 B2 * | 2/2009 | Devarajan et al. ............ 345/420 |
| 7,688,318 B2 | 3/2010 | O'Malley, III et al. |

FOREIGN PATENT DOCUMENTS

WO    WO 2013/043496    3/2013

OTHER PUBLICATIONS

Solidworks. "Beginner's Guide to solidworks 2009", SDC Pulications. 2009. 57 Pages.*
Ma, Weiyin, et al., "A hierarchically structured and constraint-based data model for intuitive and precise solid modeling in a virtual reality environment", *Computer-Aided Design*, 36(10):903-928 (2004).
Sohrt, Wolfgang, et al., "Interaction With Constraints in 3D Modeling", *ACM, Dept. of Computer Science, Univ. of Utah*, pp. 387-396 (1991).
Swaminathan, Arun, et al., "An Experience-Based Assembly Sequence Planner for Mechanical Assemblies", *IEEE Transactions on Robotics and Automation*, 12(2):252-267 (1996).
Notification of Transmittal of The International Search Report and The Written Opinion of the International Searching Authority, or the Declaration, for PCT/US2012/055460, dated Nov. 30, 2012.

* cited by examiner

*Primary Examiner* — Eunhee Kim
(74) *Attorney, Agent, or Firm* — Hamilton, Brook, Smith & Reynolds, P.C.

(57) ABSTRACT

Automatically adding constraints between entities in a subject computer-aided design (CAD) model of a real-world object includes storing information regarding CAD model entities and related constraints in a computer database in which the CAD model entities belong to one or more components of the subject CAD model or other CAD models. The computer database is accessed to determine previously used constraints for at least one entity of a given component being added to the CAD model, and constraints are automatically added between at least one entity of the given component and another entity in the subject CAD model based on the previously used constraints.

20 Claims, 12 Drawing Sheets

AUTOMATIC COMPONENT INSERTION AND CONSTRAINT BASED ON PREVIOUS-USE DATA

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

A solid modeling system may be a feature-based 3D CAD system wherein a part is constructed using various features. Examples of features include bosses, fillets, chamfers, cuts, holes, shells, lofts, and sweeps. Commercially available feature-based modeling systems include the SolidWorks® 2011 software system available from Dassault Systèmes SolidWorks Corporation of Concord, Mass. SolidWorks software and other commercially available CAD systems store the contents of parts, subassemblies, and assemblies in a data file. In addition to features, the contents of CAD data files may include design profiles, layouts, internal components (e.g., bodies), and graphical entities.

Reusing components as often as possible is an established engineering best-practice. For example, an automobile manufacturer will often seek to use the same wheels on several models of vehicles. Although the vehicles themselves may be very different, the manner in which the wheels are attached to the vehicle is usually the same, that is, wheels are usually centered on a hub through the wheel's center hole and attached to the vehicle through lug nuts or bolts.

In current state-of-the-art CAD systems, when the design engineer inserts a wheel into a new vehicle design model, for example, the design engineer may need to execute a constraint process to attach the wheel to the vehicle. Defining constraint relationships (e.g., mating relationships) for parts in a CAD model may be a tedious process involving many mouse clicks for each part in the constraint relationship. Yet in many cases, the components being constrained by the design engineer have been previously constrained by someone else in the design engineer's organization or community, and thus the work to establish a similar constrained relationship within a new model is at least in part a repetition of the work already done by others. That is, a similar constraint process may have already been executed in previous vehicle designs in which the wheel was attached in the same way.

Current approaches to this problem include geometry-based solutions and predetermined mate-reference solutions. Geometry-based solutions allow a design engineer to select and drag or otherwise specify a particular geometry to be mated. In SolidWorks® software, the SmartMates tool provides for a geometry-based solution. SmartMates can be used to determine that a circular edge on one component and a circular pattern on a second component match (e.g., have the same radius), and can add a concentric mate to align the circular edge with the circular pattern. This approach does not reuse any intelligence from previous uses of components.

Predetermined mate-reference solutions allow a design engineer to manually define a constrained relationship ahead of time through selections and specifications of mates likely to be needed later. Once the definition is completed, components can be constrained automatically if certain conditions are met. However, this prior setup requirement has proved to be a barrier to adoption because, in most cases, manually constraining a component is easier than taking the time to define constrained references in advance. Further, predetermined mate-reference solutions require a level of premeditation and setup that design engineers may find too cumbersome for all but the most commonly used components. Thus, defining mate references in advance is not always efficient use of a design engineer's time.

SUMMARY OF THE INVENTION

In general, in one aspect, embodiments of the invention feature a computer-implemented method of automatically adding constraints between entities in a subject (i.e., current work in progress) CAD model. The method involves storing in a computer database information regarding CAD model entities and related, where the CAD model entities belong to the subject CAD model and/or other CAD models. For a given component that is to be added to the subject model, the database is then accessed to determine previously used constraints for at least one entity of the given component to be added. Based on the previously used constraints, constraints between at least one entity of the given component and another entity in the subject model are automatically added. Additionally, rules for detecting geometry and/or topology conducive to constraining the given component may be employed, and the rules may be extendible by a user to enable detection of additional potential entities to constrain the given component.

Some embodiments also access the database to determine, based on previous-use data stored in the database, an additional component commonly used with the given component, and automatically add constraints between entities of the given component and the additional component as used in the subject CAD model. The information in the database may include information regarding CAD model entities and related constraints in a component management database, such as a Product Data Management (PDM) or Product Lifecycle Management (PLM) database, and may be accessible by a plurality of users (e.g., the database may be publically accessible via the Internet and by users unrelated to each other). Further, embodiments may index previously used constraints for components stored in the database and access the index when determining previously used constraints for the given component.

After determining the previously used constraints, some embodiments may present to a design engineer of the CAD model a number of constraint sets from which to choose. This may occur, for example, upon the designer inserting the given component in the CAD model or when the designer selects to add a constraint for the given component.

Other embodiments include a CAD system having a computer database storing information regarding CAD model entities and related constraints and a processor operatively coupled to the database. In such embodiments, the processor accesses the computer database to determine previously used constraints for at least one entity of a given component to be added to a CAD model and automatically adds constraints between at least one entity of the given component and another entity in the model based on the previously used constraints.

Yet other embodiments include a computer-readable data storage medium containing instructions for automatically adding one or more constraints between entities in a CAD model. Further instructions initiate access to a computer database, determine one or more previously used constraints for an entity of a given component in the CAD model, and automatically add a constraint based on the previously used constraints.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF THE INVENTION

The embodiments disclosed herein enable design engineers of all experience levels to reduce or eliminate the number of steps needed to constrain components in a computer-aided design (CAD) model by referencing previously used constraint data. The present invention automatically analyzes instances where components have previously been used in the CAD model currently being designed and/or CAD models previously designed and accessible to the current CAD model. The automatic analysis determines a likely constraint scheme for components of the current CAD model without user intervention. The analysis may utilize information stored and indexed in a database for fast retrieval. When a component is inserted into the current CAD model, the present invention may suggest a constraint scheme to be used that is likely to be the constraint scheme the design engineer desires.

Figure 1:
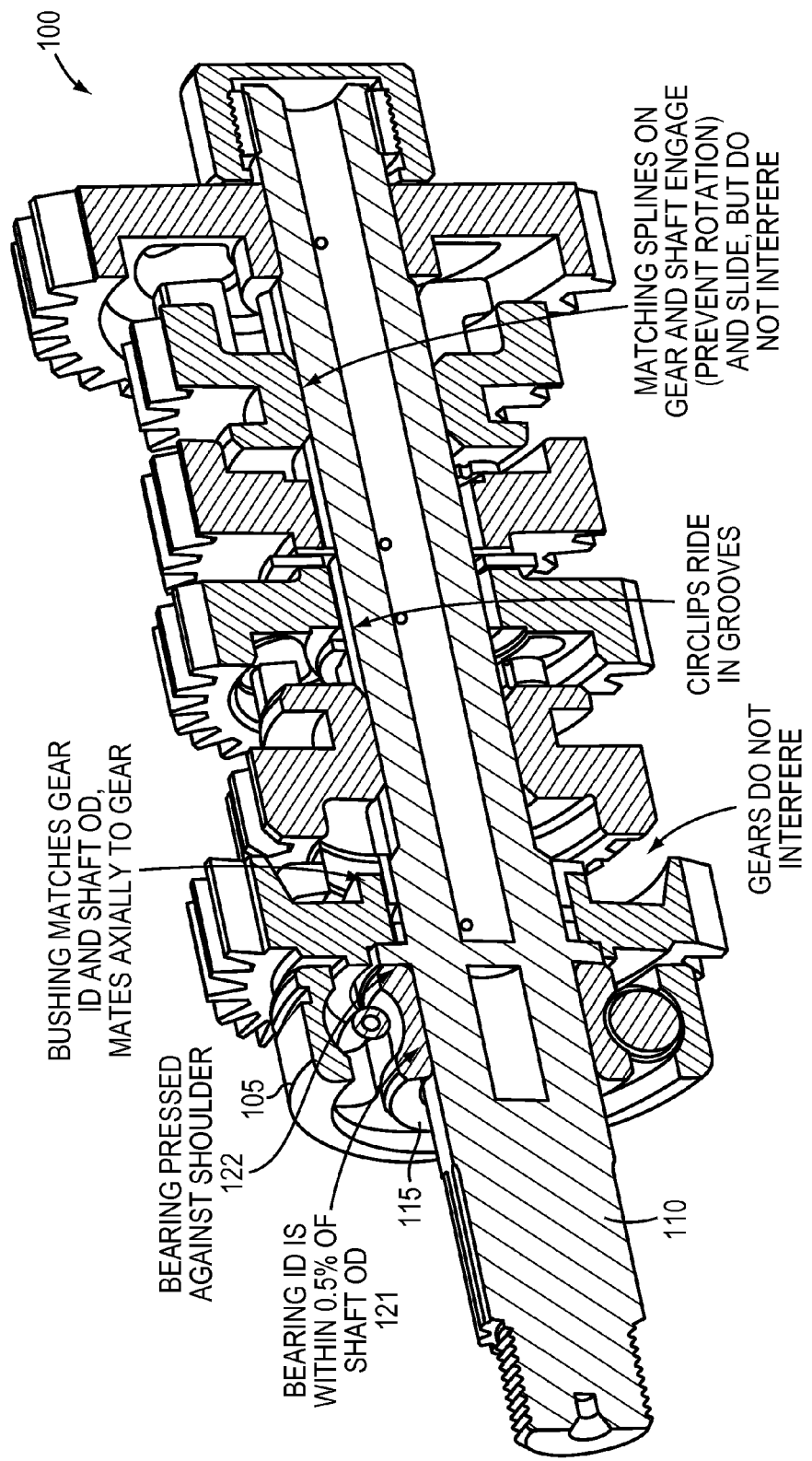
FIG. 1 is an illustration of an annotated computer-generated model.

FIGS. 1-5 illustrate components of a computer-generated model 100, and annotations imparting knowledge that a design engineer may consider when designing such a model 100, including how components of the model 100 may be constrained. FIG. 1 illustrates a computer-generated model 100 with various annotations. For example, a bearing component 105 may be mated with a shaft component 110 such that the inner diameter (ID) of the bearing 105 is within 0.5% of the outer diameter (OD) of the shaft 110, as indicated by a tolerance annotation 121. Another annotation 122 specifies that the bearing component 105 should be pressed against a shoulder 115 of the shaft component 110.

Figure 2:
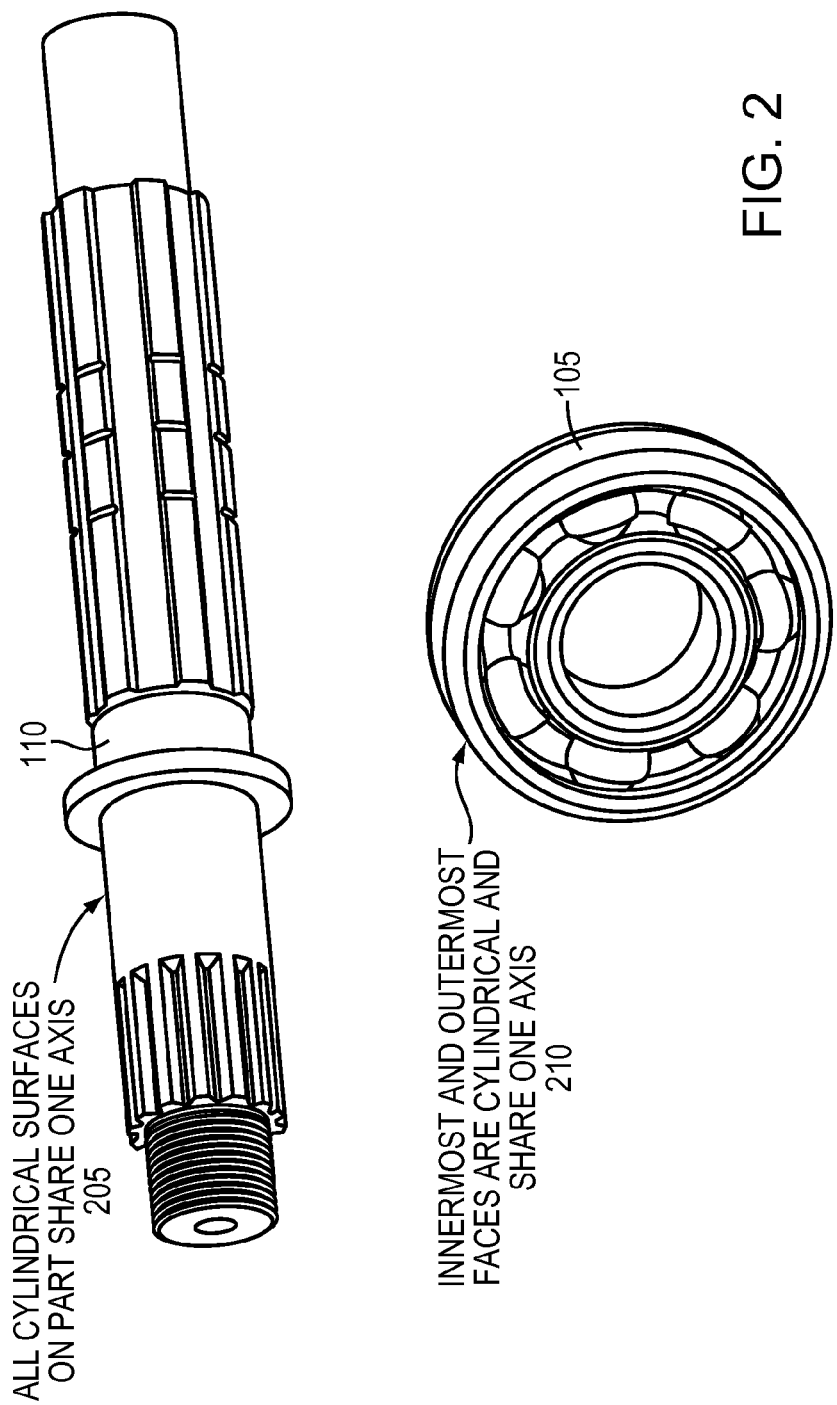
FIG. 2 is an illustration of annotated components of the computer-generated model of FIG. 1.

FIG. 2 illustrates the bearing and shaft components 105, 110 of the computer-generated model of FIG. 1 with annotations specifying geometric conditions. For example, an annotation 205 specifies that all cylindrical surfaces on the shaft component 110 should share one axis. Another annotation 210 indicates that the innermost and outermost face of the bearing component 105 should be cylindrical and share an axis.

Figure 3:
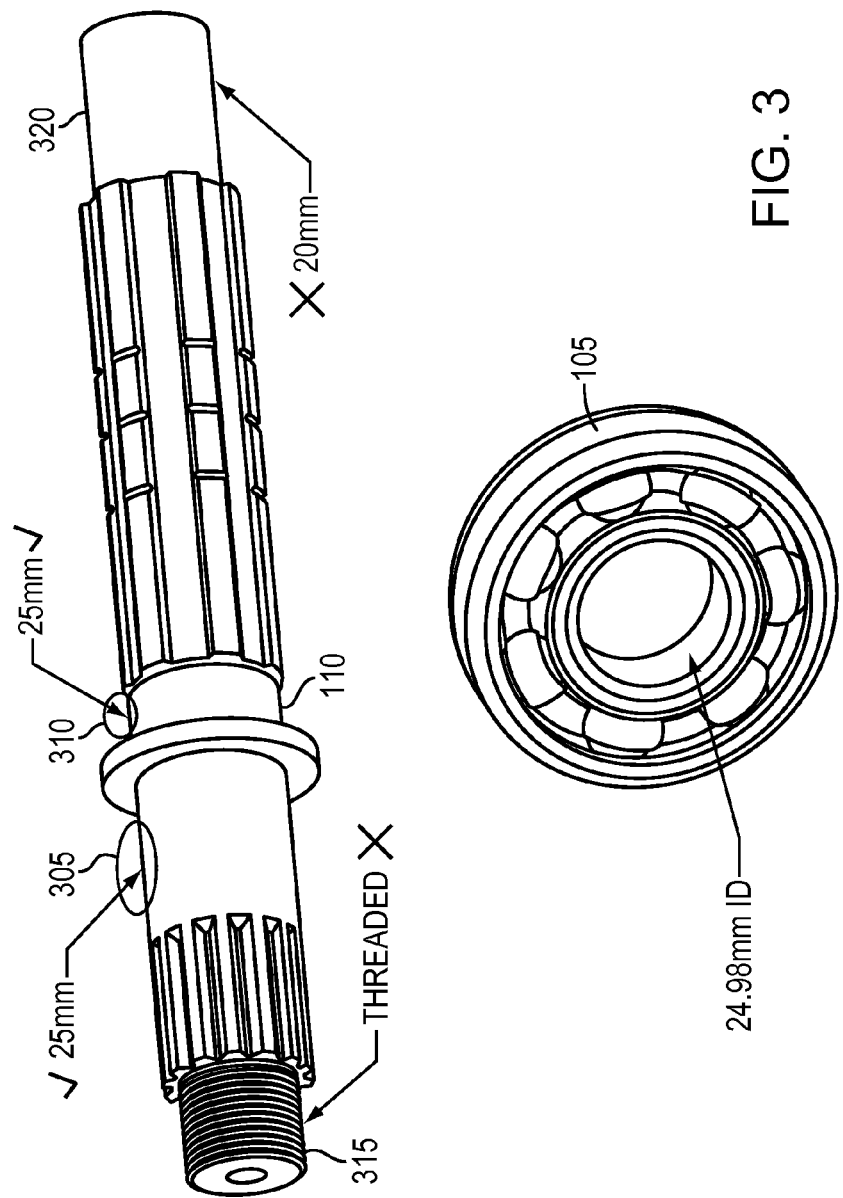
FIG. 3 is an illustration of annotated components of the computer-generated model of FIG. 1.

FIG. 3 illustrates the bearing and shaft components 105, 110 along with information regarding how the components 105, 110 may be mated. For example, the bearing 105 having an inner diameter of 24.98 mm may be mated to two locations 305, 310 on the shaft 110, the two locations 305, 310 having outer diameters of 25 mm. Whereas, the bearing 105 having the inner diameter of 24.98 mm may not be mated to the threaded portion 315 or the 20 mm end 320 of the shaft component 110, as denoted in the annotation with a bold X.

Figure 4:
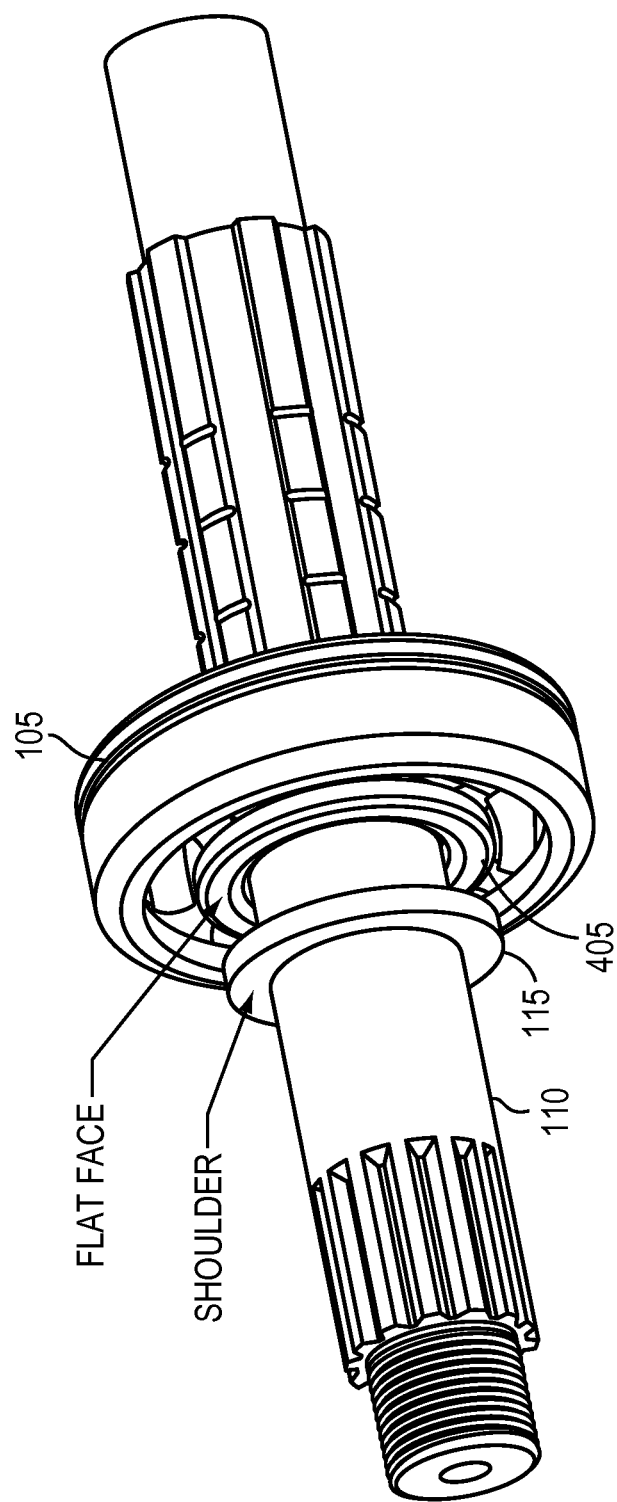
FIG. 4 is an illustration of annotated components of the computer-generated model of FIG. 1.

FIG. 4 illustrates a mating of the bearing 105 and shaft 110 components. As shown in FIG. 4, a flat face 405 of the bearing 105 may be mated to a shoulder 115 of the shaft 110.

Figure 5:
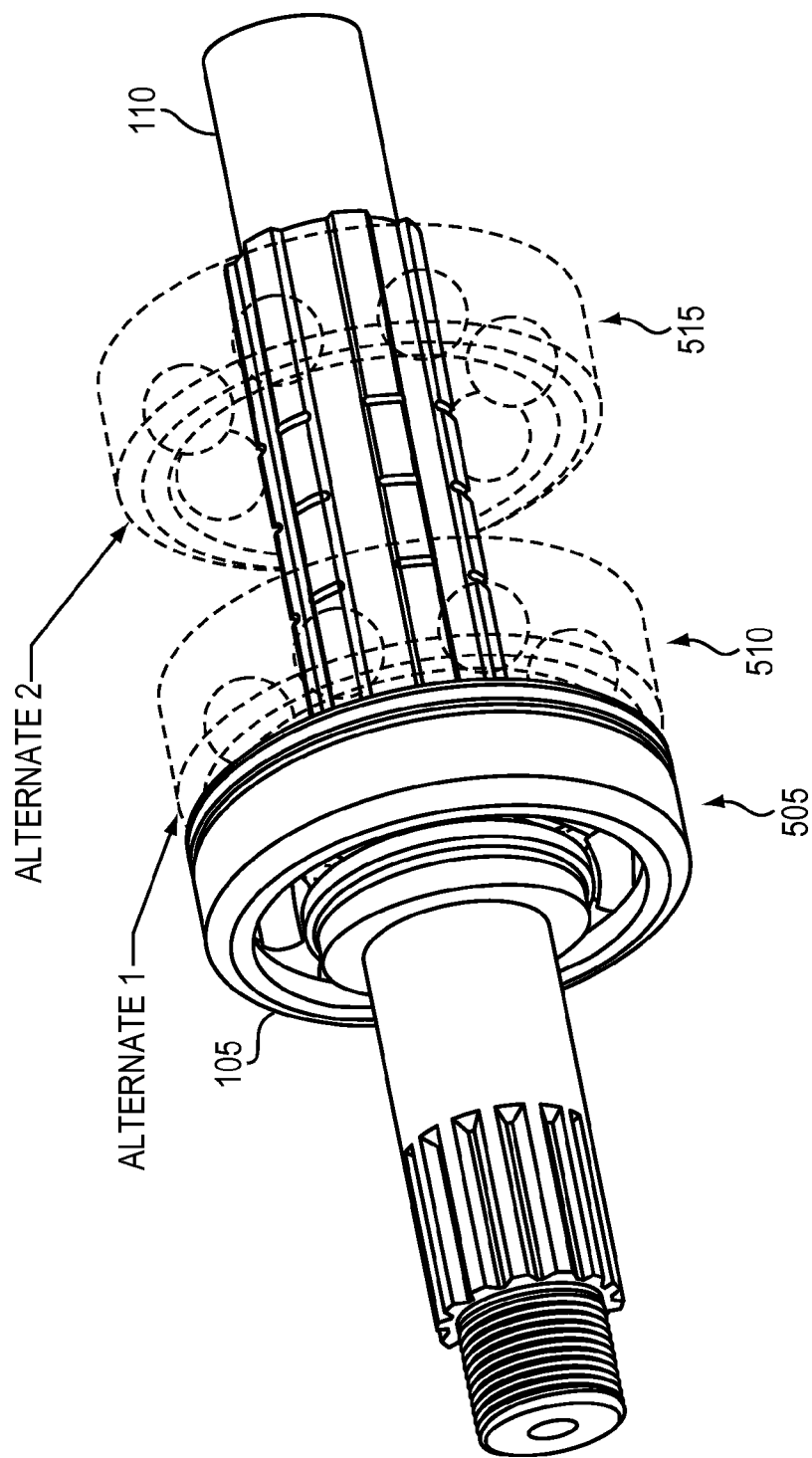
FIG. 5 is an illustration of alternative mating arrangements for components of the computer-generated model of FIG. 1.

FIG. 5 illustrates alternate mating arrangements for the bearing and shaft components 105, 110. The bearing 105 may be mated to the left side of the shoulder (obscured in FIG. 5) on the shaft 110 in a first position 505, or the right side of the shoulder on the shaft 110 in a second position 510, or, though perhaps less desirable, on the shaft 110 apart from the shoulder in a third position 515.

A design engineer commonly uses certain components together. For example, air cylinders are a common component in automated machinery, and, in general, a rod end is attached to a piston of the air cylinder. Because of the wide variety of rod ends, rod ends are not usually included as a component of a cylinder. Moreover, established best-practice is for a company to use the same rod ends as have been used previously, whenever appropriate. However, the company might use hundreds of rod ends of all shapes and sizes, most of which might not even fit a given air cylinder. To address this, embodiments of the present invention may automatically analyze instances where components are used (e.g., air cylinders) to determine other components commonly used (e.g., rod ends) with the inserted components, and store this information for fast retrieval (e.g., using a computer database index). When such a component is inserted into a new model, a system can suggest additional components that are frequently used with the inserted component. The additional components can then be inserted automatically, if desired by the design engineer. The additional components may also be automatically constrained while being inserted.

In many CAD systems, the process of collecting data that can then be analyzed to deduce constraints between components may be difficult due to the data being stored on disparate computer systems throughout an organization or community. However, an embodiment of the present invention utilizes a CAD system with a tightly integrated product data management (PDM) system, which tracks the location of previously used components and stores relevant data about constraint relationship of the previously used components in a database that may be indexed, thereby providing an advantage of effectively indexing the data relating to the previously used components.

Additionally, components may be located and downloaded via a community forum, from a component supplier website, and from a community site such as the 3D ContentCentral® service provided by Dassault Systemes SolidWorks Corporation of Concord, Mass. Moreover, if components downloaded from external sources contain previous-use data, embodiments of the present invention may integrate the previous-use data for such components in an organization's CAD system database and/or PDM system. In this way, components may be downloaded along with the data indicating constraints previously implemented by others. Thus, previous-use data from an entire community may be compiled and stored in an online database and used to provide the benefits described herein whenever a design engineer inserts a component having previous-use data.

While components are often used the same way every time, variations may exist. Thus, embodiments may employ a heuristic method to determine which combinations of constraints and components are likely to be desired. The heuristic method may use a combination of statistical analysis, geometric analysis, and contextual user action (e.g., user selection of specific geometry in a CAD model) to decide which constraint schemes and additional components to proffer a design engineer.

Further, design engineers are unlikely to use automatic functionality if a different workflow is required (e.g., different than constraining parts manually). Thus, embodiments of the present invention unobtrusively offer constraint scenarios as part of a manual mating workflow, thereby enabling the design engineer to quickly consider a suggested constraint scheme, and continue with the manual workflow if desired.

An example process for constraining inserted components, according to principles of the present invention, may be as follows. Users of a CAD system assemble components manually in the usual course of work. The components and the entities used to constrain the components may be stored in a PDM database. An automated process may then search the database and determine which components are used frequently, whether those components are usually constrained in a particular way, and whether certain other components are frequently used with those components. The resulting analysis may be stored in the PDM database as previous-use data in such a way that the previous-use data can be quickly retrieved (e.g., by employing indexing or other techniques that improve data retrieval). Subsequently, when a design engineer inserts a component for which previous-use data is available, and begins to manually constrain the component, embodiments of the present invention unobtrusively proffer a constraint scheme based on the stored previous-use data. The design engineer may preview the results of such a suggested constraint scheme, and may accept the suggested constraint scheme. If not, the design engineer may continue adding constraints via a manual process.

Figure 6:
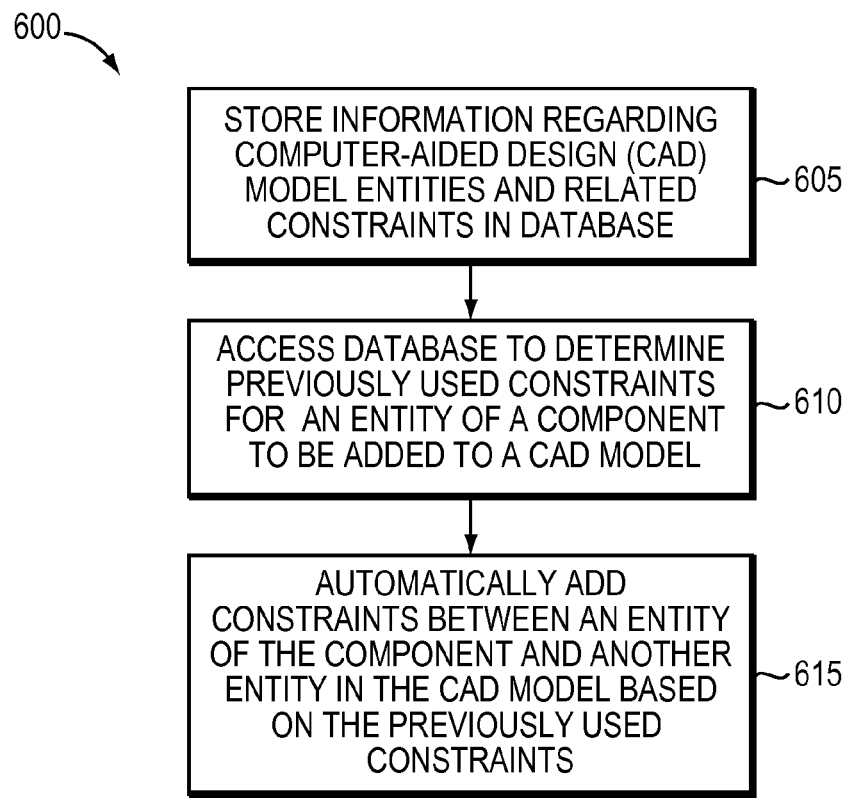
FIG. 6 is a flow diagram illustrating automatically adding constraints according to an example embodiment of the present invention.

Referring now to FIG. 6, a flow diagram 600 illustrates automatically establishing constraints between entities in a CAD model according to an example embodiment of the present invention. Information regarding CAD model entities and related constraints are stored in a computer database (step 605). The database is then accessed to determine previously used constraints for at least one entity of a given component to be added to a CAD model being designed or updated (step 610). In the next step, constraints are automatically added between at least one entity of the given component and another entity in the CAD model being designed or updated based on the previously used constraints (step 615). Entities herein refer to topological vertices, edges, and faces, or supporting geometric entities such as points, curves, and surfaces.

FIGS. 7-10 are detailed flow diagrams illustrating automatically adding constraints between entities in a subject (also referred to herein as current) CAD model according to an example embodiment of the present invention.

Figure 7:
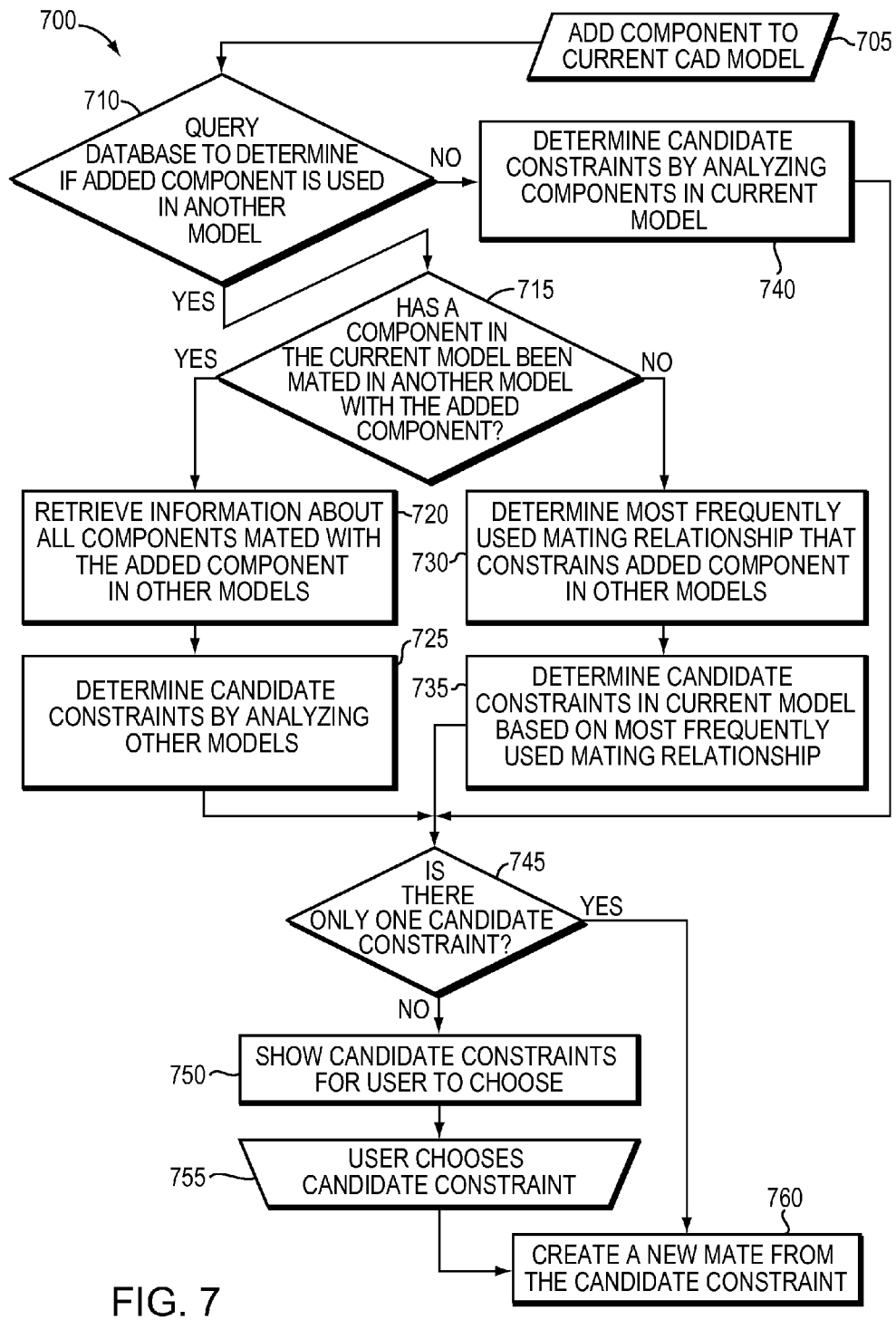
FIGS. 7-10 are detailed flow diagrams illustrating automatically adding constraints according to an example embodiment of the present invention.

Referring now to FIG. 7, an example process 700 begins by adding a component to a subject model (step 705). A database is queried to determine if the added component has been used in another model (step 710), and if so, determines whether one or more components in the subject model has been mated with the added component in another model (step 715). If a component in the subject model and the added component have been mated in another model, process 700 retrieves information about the component mated with the added component in other models as well as the component mated with the added component (step 720). In the next step (step 725), process 700 determines a set of candidate constraints based on the retrieved information in the previous step, which will be discussed further with reference to FIG. 9.

Returning to FIG. 7 step 715, if a component in the subject model has not been mated with the added component in another model (step 715), process 700 determines the most frequently used mating relationship that constrains the added component in other models (step 730). In the next step, process 700 determines a set of candidate constraints in the current model based on the determined most frequently used mating relationships (step 735), which will later be discussed with reference to FIG. 10.

Returning to FIG. 7 step 710, if the component to be added to the subject model has not been used in another model (step 710), process 700 determines candidate constraints by analyzing components in the subject model (step 740), as described with reference to FIG. 8.

Figure 8:
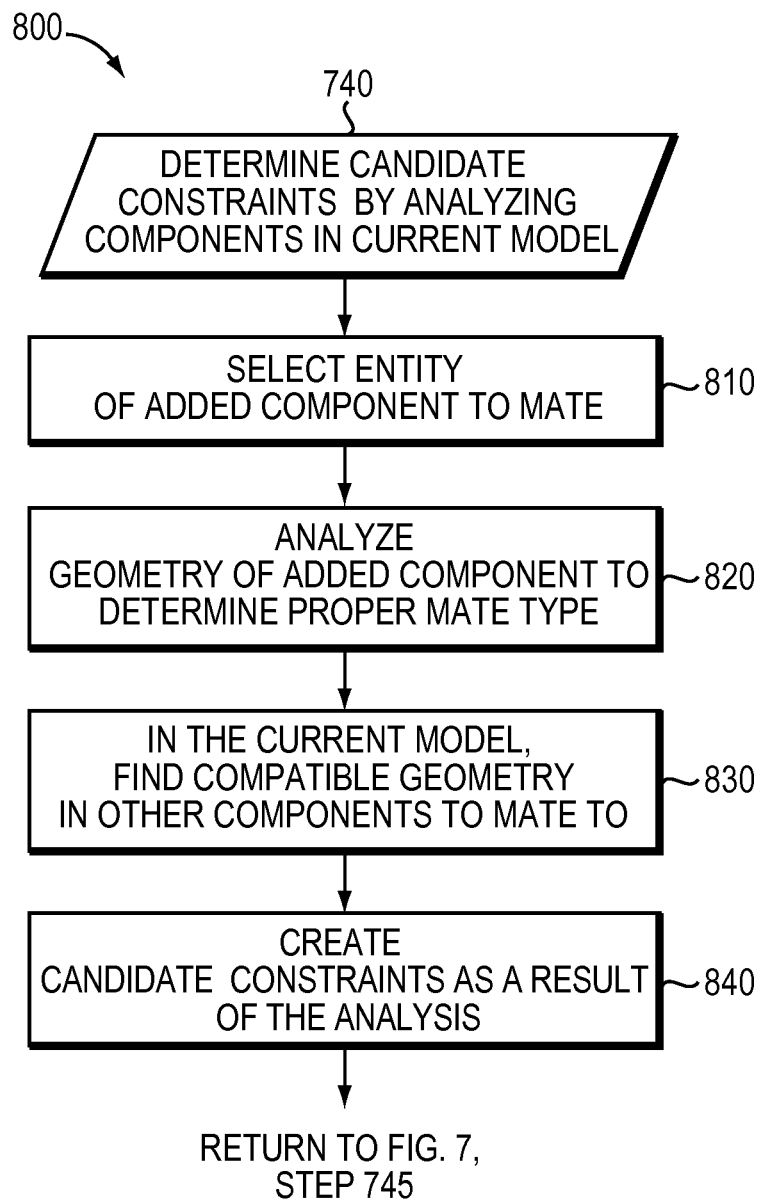

Referring now to FIG. 8, process 800 determines candidate constraints by analyzing components in the current model (step 740). First, the user specifies which entity of the added component is to be mated (step 810). The geometry of the added component is then analyzed to determine a proper mate type (step 820). Not only is the specified entity of the added component analyzed, but one or more neighboring entities are analyzed as well. Based on the result from the analysis, process 800 finds a proper mate type that is most appropriate for the given entity (step 830). In the next step, process 800 finds compatible geometry by analyzing the geometry and/or topology of other components in the current model to find geometry that is compatible in a mating sense with the specified entity. For example, if the user selects a cylindrical face, a compatible entity may be a cylindrical face having the same radius as the selected one within a certain tolerance. (This is an example of a matching rule, which is described below with reference to FIG. 10.) Process 800 then creates a set of candidate constraints that result from the analysis (step 840).

Figure 9:
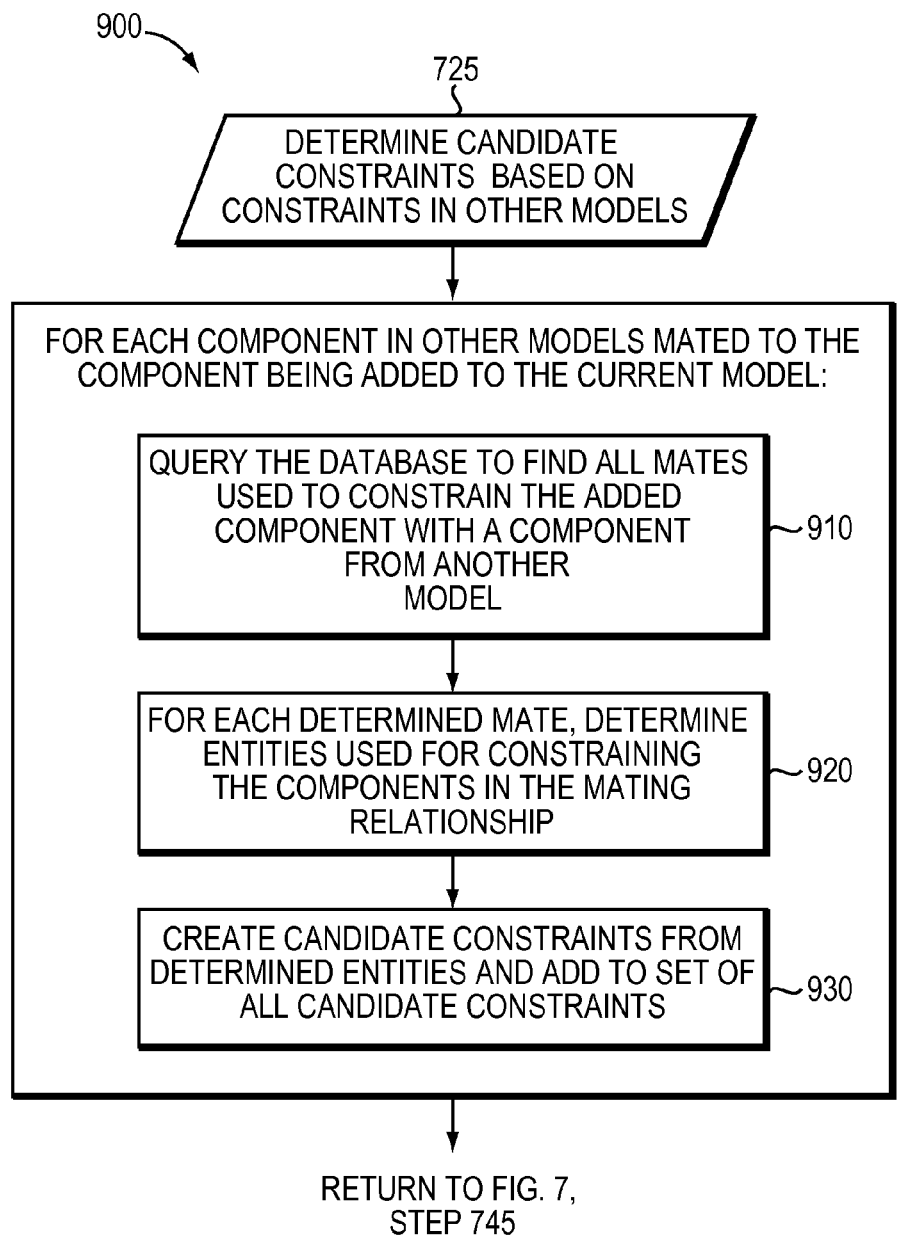

Referring now to FIG. 9, process 900 determines candidate constraints by analyzing mating relationships in other models (step 725). For each component in other models mated to the added component, process 900 queries the database to find all mating relationships between the added component and one or more other components in another model (step 910). For each mating relationship found, the entities used for mating components are determined (step 920). Candidate constraints are then created from the determined entities and added to a set of total candidate constraints (step 930).

Figure 10:
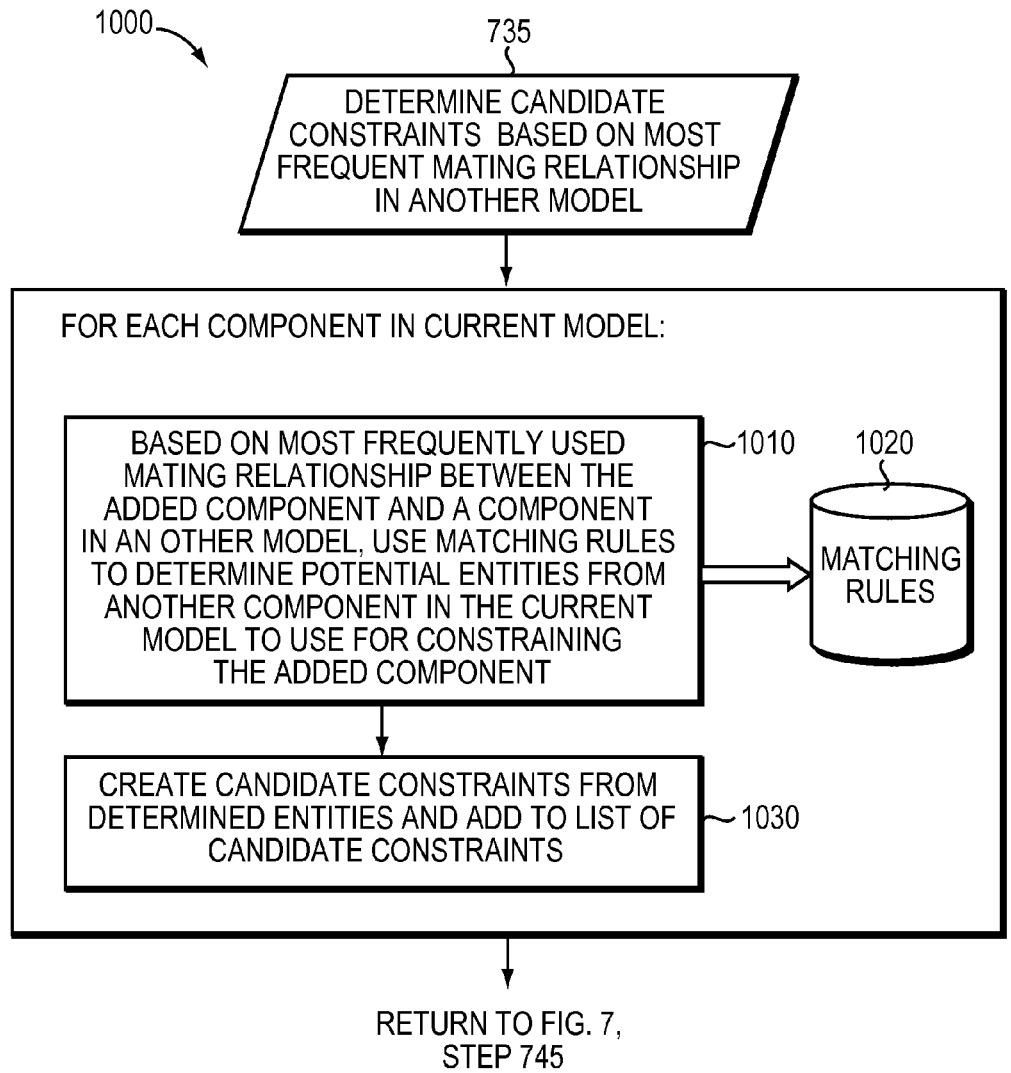

Referring now to FIG. 10, process 1000 determines candidate constraints based on the most frequently used mating relationship(s) between the added component and one or more components in other models and not in the subject model (step 735). For each component in the current model, process 1000 analyzes the component and uses matching rules 1020 to detect geometry and/or topology conducive to constraining the added component and thereby determines potential entities of each component in the current model that may constrain the added component (step 1010). Matching rules define criteria for finding compatible entities in other components in the current model, which are then used to create candidate constraints. A matching rule contains a constraint type and a set of matching conditions. A matching condition specifies the entity type, geometry type as well as which dimensions of the entity are important (e.g., radius of a cylindrical, base, and height), and the values of these dimensions, perhaps within a certain tolerance. An initial set of matching rules may be included with a computerized modeling system, with a means by which a user may add additional rules. For example, an initial set may include a matching rule that, given a cylindrical face (such as may be found on a bearing), locates a second cylindrical face having a radius smaller by a certain percentage within a certain tolerance (such as may be found on a rod). Another example of a matching rule may consider surface finish, such as a threaded or smooth finish.

After matching rules aid in the determination of matching entities, process 1000 creates candidate constraints from the determined entities and adds the newly created candidate constraints to a set of total candidate constraints (step 1030).

Referring back to FIG. 7, steps 725, 735, and 740, and the respective processes 900, 1000, and 800, determine the set of candidate constraints. In a preferred embodiment, a candidate constraint is represented by a data structure that contains an entity type, a geometry type, an indication of dimensions of the entity that are important (e.g., radius of a cylindrical, base, and height), and values of the important dimensions. Process 700 then determines if only one candidate constraint exists (step 745). If more than one candidate constraint exists, process 700 presents the multiple candidate constraints to a user as alternative choices for the user to select (step 750). When the user selects one of the presented candidate constraints (step 755), process 700 creates a new mate for the component based on the user-selected candidate constraint. On the other hand, if process 700 determines that only one candidate constraint exists, a new mate for the component is created from the one candidate constraint (760).

The preceding discussion considers the situation when a component is being added to the model. Another situation may occur when the component has already been added and the user then wants to mate the added component. In this case, the user specifies an entity of the added component to mate prior to step 710 in FIG. 7, and does not need to do so again in step 810 in FIG. 8.

Figure 11:
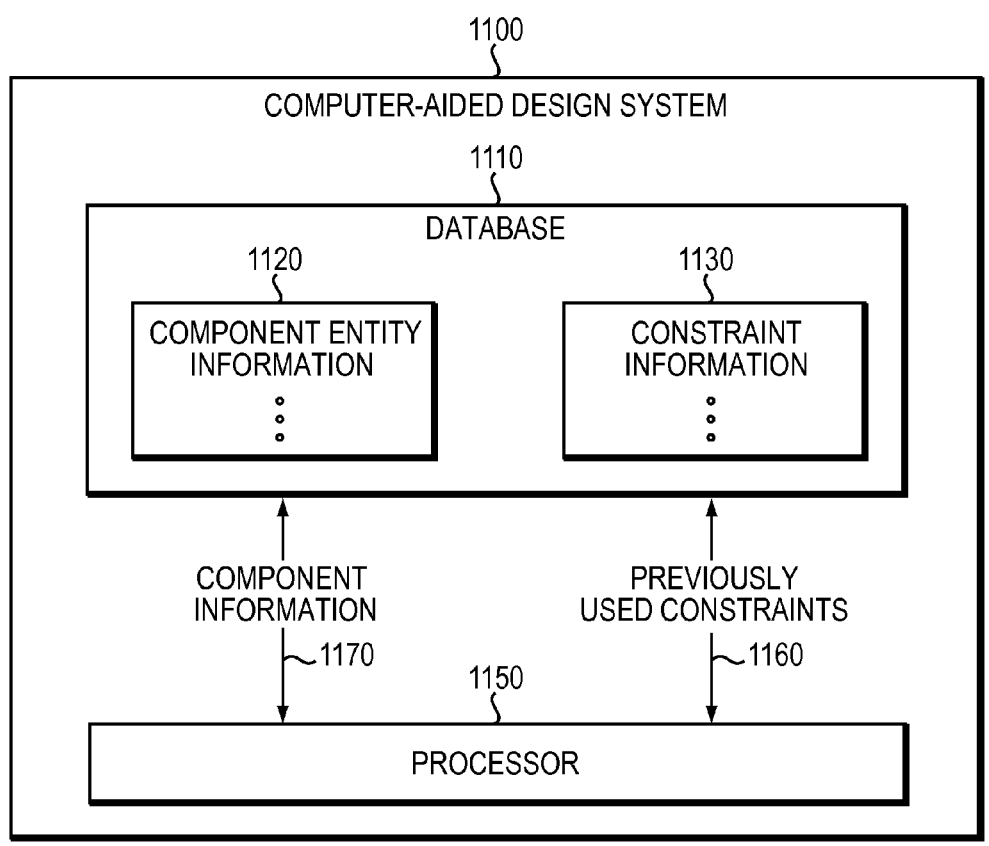
FIG. 11 is a block diagram illustrating a computer-aided design system according to an example embodiment of the present invention.

FIG. 11 is a block diagram illustrating a computer-aided design system 1100 according to an example embodiment of the present invention. The example system 1100 includes a database 1110 storing previous-use data, for example, information regarding CAD model components and entities 1120 and corresponding constraints 1130. The previous-use data 1120, 1130 may be indexed according to model components and entities 1120 to quickly retrieve the data. The system 1100 also includes a processor 1150 operatively coupled to the database 1110 and accesses the database 1110 to retrieve previously used constraints 1160 for at least one entity of a given component 1170 to be added to a CAD model. The processor 1150 also automatically adds constraints between at least one entity of the given component 1170 and another entity in the CAD model based on the previously used constraints 1160. Database 1110 enables the processor 1150 to efficiently make such determinations and efficiently access the constraints 1160 using techniques such as indexing.

Figure 12:
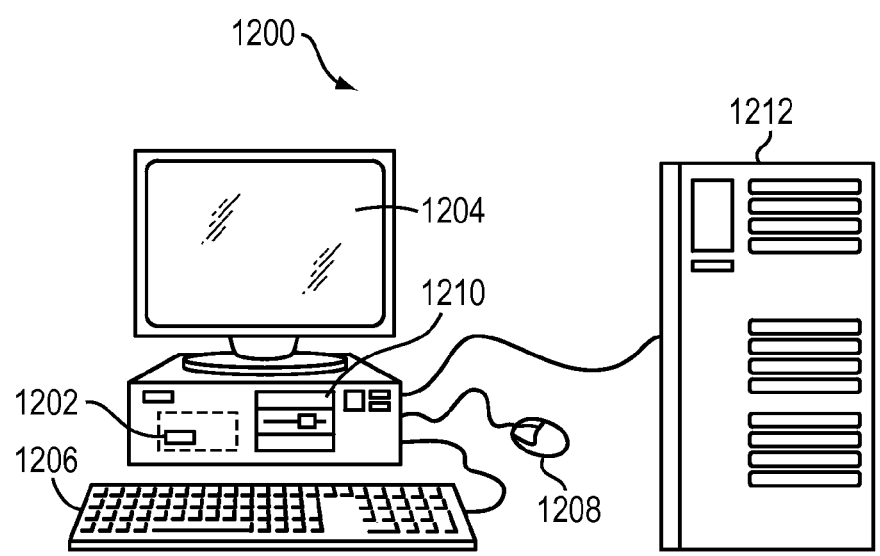
FIG. 12 is a schematic diagram of a computer system in which embodiments of the present invention may be implemented.

FIG. 12 illustrates a computerized modeling system 1200 that includes a CPU 1202, a computer monitor 1204, a keyboard input device 1206, a mouse input device 1208, and a storage device 1210. The CPU 1202, computer monitor 1204, keyboard 1206, mouse 1208, and storage device 1210 can include commonly available computer hardware devices. For example, the CPU 1202 can include an Intel-based processor. The mouse 1208 may have conventional left and right buttons that the design engineer may press to issue a command to a software program being executed by the CPU 1202. As an alternative or in addition to the mouse 1208, the computerized modeling system 1200 can include a pointing device such as a trackball, touch-sensitive pad, or pointing device and buttons built into the keyboard 1206. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7, UNIX, Linux, or MAC OS operating systems.

Additional computer processing units and hardware devices (e.g., rapid prototyping, video, and printer devices) may be included in the computerized modeling system 1200. Furthermore, the computerized modeling system 1200 may include network hardware and software thereby enabling communication to a hardware platform 1212, and facilitating communication between numerous computer systems that include a CPU and a storage system, among other computer components.

Computer-aided modeling software (e.g., processes 600, 700, 800, 900, and 1000) may be stored on the storage device 1210 and loaded into and executed by the CPU 1202. The modeling software allows a design engineer to create and modify a 3D model and implements aspects of the invention described herein. The CPU 1202 uses the computer monitor 1204 to display a 3D model and other aspects thereof as described. Using the keyboard 1206 and the mouse 1208, the design engineer can enter and modify data associated with the 3D model. The CPU 1202 accepts and processes input from the keyboard 1206 and mouse 1208. The CPU 1202 processes the input along with the data associated with the 3D model and makes corresponding and appropriate changes to that which is displayed on the computer monitor 1204 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

The embodiments disclosed herein effectively reuse constraint information in previously designed CAD models, and alleviate much of the manual work necessary to similarly constrain a component in a CAD model currently under development. In effect, the embodiments allow an automatic learning of how components are typically used in an organization, and can use that knowledge to reduce or eliminate the number of steps needed by a design engineer to constrain components in a CAD model currently being designed.

An advantage of the embodiments disclosed herein is that typical uses of CAD components by an organization are automatically stored and serve as a previous-use resource for models that will be designed in the future. The storage of the typical uses grows over time as additional components are developed and as components are used in new ways. Accessing the previous-use resources may reduce or eliminate the number of steps needed by a design engineer to constrain CAD components in the absence of such previous-use resources. Design engineers of all experience levels can then add a new component to a CAD model with less effort, thereby saving time and cost when designing a CAD model.

Another advantage is that the embodiments disclosed herein can automatically suggest additional components that are frequently used with a component being added to a model. The additional components can then be inserted automatically and further, can be automatically constrained, again saving time and cost when a design engineer designs a CAD model.

Other advantages of the embodiments disclosed herein include leveraging a Product Data Management (PDM) system's database to effectively store and index the previous-use data, compiling and using previous-use data from an entire community of users, using a heuristic method to suggest the most likely constraint scheme, and suggesting the constraint scheme in a non-obtrusive user-friendly manner.

A number of embodiments of the present invention have been described. Nevertheless, it will be understood that various modifications may be made without departing from the spirit and scope of the invention. For example, the database used to store CAD model entities may be incorporated in a PDM system or a Product Lifecycle Management (PLM) system. Furthermore, implementations may change the order in which operations are performed. Furthermore, depending on the needs of an implementation, particular operations described herein may be implemented as a combined operation, eliminated, added to, or otherwise rearranged. For example, as previously discussed, if the component has already been added, the user must select an entity to mate at the beginning of process 700 and process 800 does not need to do so. Furthermore, particular user interface operations relative to a mouse (e.g., click, drag, drop, etc.) are by way of illustration and not limitation. Other user interface operations for selecting, moving, placing, etc., model or design data are suitable.

What is claimed is:

1. A computer-implemented method of automatically adding constraints between entities in a subject computer-aided design (CAD) model of a real-world object, the method comprising:
   storing information regarding CAD model entities and related constraints in a computer database, wherein the CAD model entities belong to one or more components of at least one of the subject CAD model and other CAD models;
   for one CAD model entity of a given component that is one of to be added to and in the subject CAD model, accessing the computer database to determine constraints that have been previously used for at least the one CAD model entity of the given component, the determined constraints having been previously used in at least one of the subject CAD model and the other CAD models; and
   automatically adding to the subject CAD model a new constraint between at least the one CAD model entity of the given component and another entity in the subject CAD model based on the previously used constraints.

2. The computer-implemented method of claim 1 wherein:
   accessing the computer database to determine constraints that have been previously used includes determining an additional component commonly mated with the given component; and
   automatically adding to the subject CAD model the new constraint between entities of the given component and the additional component included in the subject CAD model.

3. The computer-implemented method of claim 1 further comprising employing rules for detecting at least one of geometry and topology conducive to constraining the given component.

4. The computer-implemented method of claim 3 wherein the rules are extendible by a user to enable detection of additional potential entities to constrain the given component.

5. The computer-implemented method of claim 1 further comprising indexing constraints that have been previously used for components stored in the computer database and wherein accessing the computer database to determine constraints that have been previously used includes accessing an index for the given component.

6. The computer-implemented method of claim 1 wherein accessing the computer database to determine constraints that have been previously used constraints includes determining the constraints based on a mating relationship used most frequently for the given component in other CAD models.

7. The computer-implemented method of claim 1 wherein storing information in the computer database includes storing information regarding CAD model entities and related constraints in a product data management database accessible by a plurality of users.

8. The computer-implemented method of claim 1 further comprising presenting to a designer of the CAD model one or more constraints from which to choose at one of a time during the process of inserting the given component in the CAD model and a time after the given component is inserted in the CAD model.

9. A computer-aided design (CAD) system comprising:
a computer database configured to store information regarding CAD model entities and related constraints; and
a processor operatively coupled to the computer database and configured to (i) access the computer database to determine constraints that have been previously used for at least one entity of a given component that is one of to be added to and in a subject CAD model of a real-world object, the determined constraints having been previously used in at least one of the subject CAD model and other CAD models, and (ii) automatically add to the subject CAD model a new constraint between at least the one entity of the given component and another entity in the subject CAD model based on the previously used constraints.

10. The computer-aided design system of claim 9 wherein the processor configured to access the computer database to determine constraints that have been previously used is further configured to determine an additional component commonly used with the given component.

11. The computer-aided design system of claim 10 wherein the processor is configured to automatically add the new constraint between at least the one entity of the given component and at least one entity of the additional component.

12. The computer-aided design system of claim 9 wherein the processor is further configured to employ rules for detecting at least one of geometry and topology conducive to constraining the given component.

13. The computer-aided design system of claim 12 wherein the rules are extendible by a user to enable detection of an additional potential entity to constrain the given component.

14. The computer-aided design system of claim 9 wherein the computer database includes an index of constraints that have been previously used for the given component and wherein the processor is further configured to access the index to determine constraints that have been previously used for the at least one entity of the given component.

15. The computer-aided design system of claim 9 wherein the processor is further configured to determine constraints for the given component based on a mating relationship used most frequently for the given component in other CAD models.

16. The computer-aided design system of claim 9 wherein the computer database is a product data management database.

17. A non-transitory machine-readable storage medium having computer-readable program codes embodied therein for automatically adding one or more constraints between entities in a subject computer-aided design (CAD) model of a real-world object, the computer-readable data storage medium program codes including instructions that, when executed by a processor, cause the processor to:
for one entity of a given component that is one of to be added to and in the subject CAD model, access a computer database to determine one or more constraints that have previously been used for at least the one entity of the given component, each determined constraint having been previously used in at least one of the subject CAD model and other CAD models, and wherein the database stores information regarding CAD model entities and related constraints for the given component in at least one of the subject CAD model and the other CAD models; and
automatically add to the subject CAD model at least one new constraint between at least the one entity of the given component and another entity in the subject CAD model based on the previously used constraints.

18. The computer-readable data storage medium of claim 17 further comprising program codes that cause the processor to access the computer database to determine an additional component commonly used with the given component.

19. The computer-readable data storage medium of claim 17 further comprising program codes that cause the processor to utilize rules for detecting at least one of geometry and topology conducive to constraining the given component.

20. The computer-readable data storage medium of claim 17 further comprising program codes that cause the processor to analyze the given component for determination of a proper mate type.

* * * * *